March 21, 1967
J. C. FORD
3,310,007
TORTILLA OVEN
Filed Jan. 14, 1964
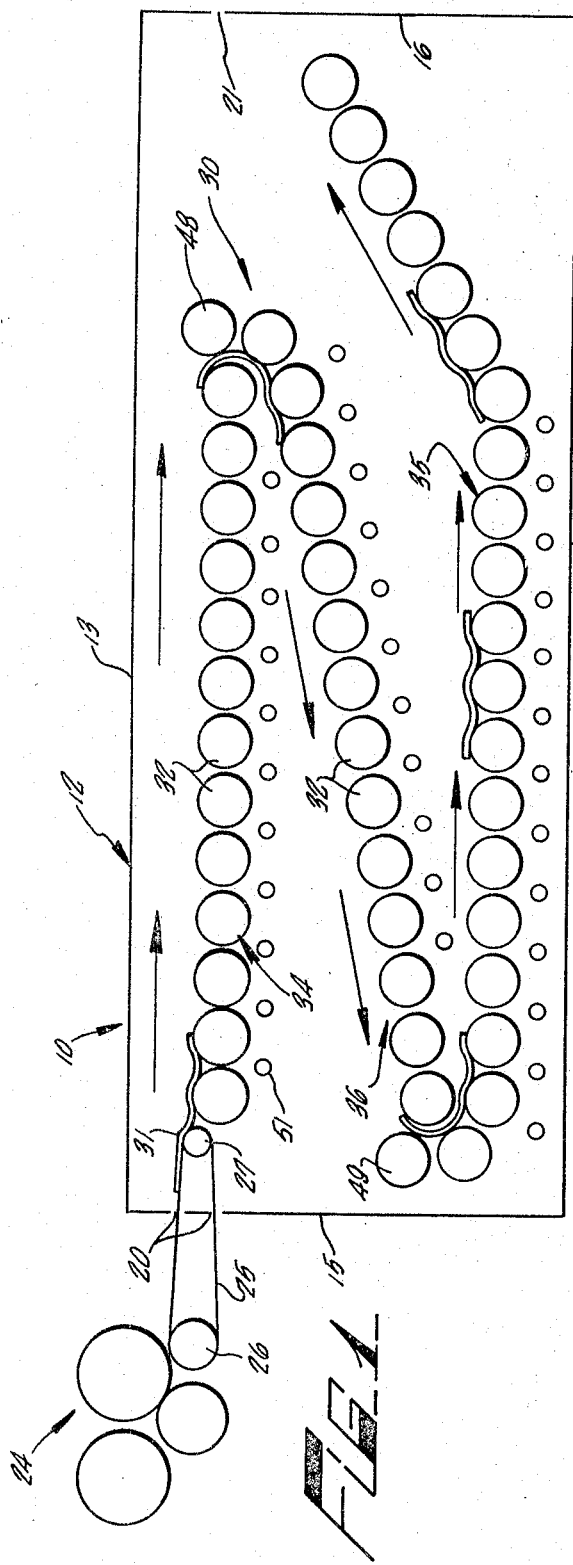
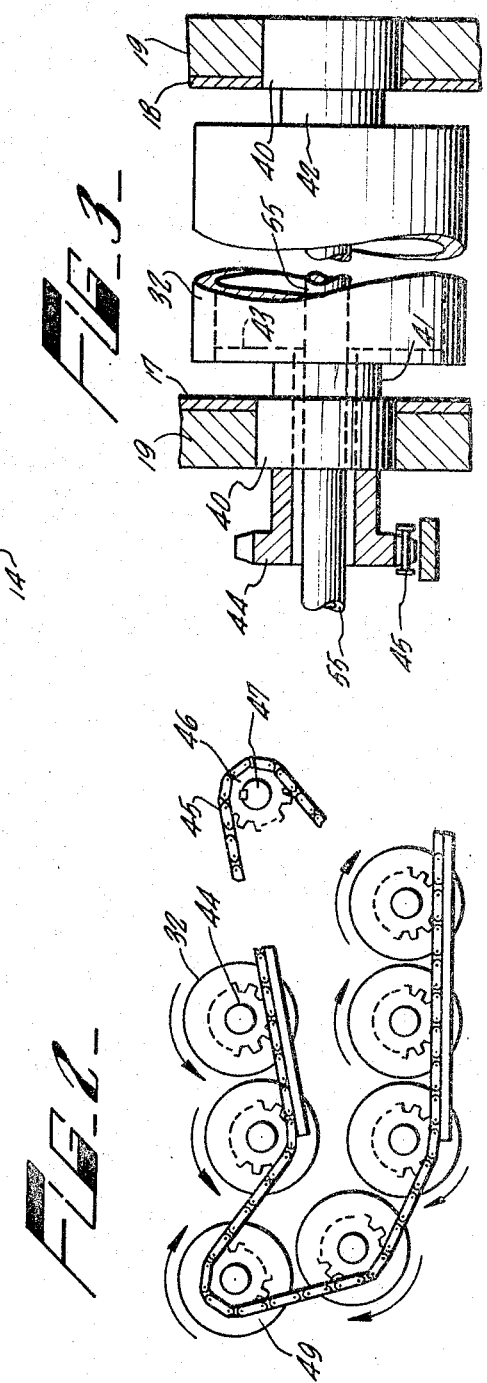
INVENTOR.
JOHN C. FORD
BY
Christie, Parker & Hale
ATTORNEYS.

3,310,007
TORTILLA OVEN
John C. Ford, 3736 Clayton Ave.,
Los Angeles, Calif. 90027
Filed Jan. 14, 1964, Ser. No. 337,651
4 Claims. (Cl. 107—57)

This invention relates to baking ovens and, more particularly, to an improved tortilla baking oven having a multi-pass roller-type tortilla conveyor therein.

Presently known tortilla baking ovens commonly provide a tortilla conveyor inside the oven. Such conveyors, however, are slat-type conveyor belts which have characteristics that disadvantageously affect tortilla baking. The high oven temperature causes sagging of the conveyor belts which results in uneven baking and requires constant maintenance. If tracks or sprockets are utilized to prevent sagging, the weight and initial expense of the oven are materially increased. Further, since a tortilla extends over more than one slat in the typical conveyor belt and does not move relative to the conveyor, non-uniform baking of the tortilla occurs. This is because all portions of the tortilla are not subjected to the same baking temperature. It has also been found that use of conveyor belts in tortilla baking not only leaves slat impressions upon the tortilla but frequently causes tearing and splitting of the baked product.

The foregoing disadvantages are avoided in the present invention in which the tortilla conveyor is of the roller type. Rotation of the rollers conveys the tortillas from roller to roller. Improved heat transfer is obtained and uniform baking of the tortillas is produced. It has also been found that passage of tortillas over the conveyor of the present invention seals the surface of those tortillas in which entrapment of moisture is required. By the present invention, uniformly baked high quality tortillas are obtained.

Generally speaking, this invention provides an oven for baking tortillas comprising an insulated enclosure. A multi-pass tortilla conveyor is disposed in the enclosure and is comprised of a plurality of rotatable cylindrical rollers. Means are operatively connected to the rollers for rotating the rollers at a predetermined rate and in predetermined directions. The oven also includes means interiorly of the enclosure at selected locations along the conveyor for heating a tortilla during transport thereof by the conveyor through the enclosure. The apparatus also includes means in the enclosure disposed in cooperation with the conveyor rollers for turning the tortilla during passage of the tortilla through the enclosure.

The above-mentioned and other features of this invention are more fully set forth in the following detailed description of the invention taken in conjunction with the accompanying drawings wherein:

FIG. 1 is a schematic cross-sectional elevation of an oven according to this invention;

FIG. 2 is an enlarged fragmentary cross-sectional elevation view of a portion of the tortilla conveyor; and FIG. 3 is a further enlarged fragmentary cross-sectional elevation view of one of the conveyor rollers and of its mounting and drive mechanisms.

Referring initially to FIG. 1, a tortilla oven 10 according to this invention is illustrated. The oven includes an enclosure 12 having upper and lower walls 13 and 14, end walls 15 and 16, and side walls 17 and 18 shown in FIG. 3. FIG. 3 further illustrates that the exterior surfaces of the enclosure surfaces are insulated, as at 19, to minimize heat loss from the interior of the enclosure. End 15 of the oven defines a pair of horizontal slot apertures 20 which comprise an inlet to the interior of the enclosure. End 16 defines an outlet opening 21 from the enclosure.

A tortilla forming and feeding mechanism 24 is disposed exteriorly of the enclosure adjacent the inlet thereto and includes a movable continuous belt 25 engaged between a first belt support roller 26, disposed exteriorly of the enclosure, and a second belt support roller 27 disposed interiorly of the enclosure adjacent slot apertures 20. The upper and lower extents of the loop defined by belt 25 pass through the upper and lower slot apertures, respectively, as shown in FIG. 1.

A triple-pass tortilla conveyor 30 is disposed in enclosure 12 and is operable to transport a tortilla 31 from the enclosure inlet to the enclosure outlet. The conveyor is comprised of a plurality of cylindrical rollers 32 which are rotatably mounted between sides 17 and 18 of the enclosure for rotation about fixed, preferably parallel and horizontal axes. Rollers 32 are grouped to define a first run 34 of rollers, a second run 35 of rollers, and a third run 36 of rollers; the rollers of each run are spaced closely adjacent to one another.

Preferably, as illustrated in FIG. 1, the first run of rollers extends horizontally from a beginning end adjacent belt support roller 27 to a terminal end disposed away from the enclosure inlet. The second run of rollers preferably is disposed below the first run of rollers in horizontal spaced apart relation to the first run. The second run of rollers has a beginning end disposed below the beginning end of the first run, and a terminal end disposed just adjacent enclosure outlet opening 21. The third run of rollers extends from the terminal end of the first roller run 34 to the beginning end of second roller run 35.

As illustrated in FIG. 1, the third run of rollers extends downwardly from the first to the second run because of the spaced apart relation between the first and second roller runs. It is within the scope of this invention, however, that the third run of rollers may be disposed directly below and parallel to the first run of rollers, and that the second run of rollers be disposed parallel to the first and third runs immediately below the third run. Where the roller runs are parallel, however, the heater elements of the oven should be disposed internally of the rollers.

As shown in FIG. 3, the opposite ends of each roller 32 are rotatably mounted to enclosure walls 17 and 18. Accordingly, each roller has associated therewith a pair of suitable bearings 40 secured opposite one another in the enclosure walls for rotatably journalling coaxially aligned axles 41 and 42 of the roller. Preferably the rollers are hollow and each roller is closed at each end by a web or end plate 43. The roller axles extend from the end plates. Axle 41 extends through and beyond its bearing 40 to define a chain drive sprocket 44. Rotation of sprocket 44 rotates axle 41 and, accordingly, roller 32.

The oven includes means operatively connected to the rollers for rotating the rollers at a predetermined rate and in predetermined directions. A closed loop of timing or drive chain 45 is engaged with each of roller drive sprockets 44. The chain is arranged so that the rollers in the third run of rollers rotate in a direction opposite to the rotation of the rollers in the first and second roller runs. The drive chain is engaged with a drive sprocket 46, as shown in FIG. 2, which is keyed to a rotatable shaft 47. Shaft 47 is rotated at a predetermined rate by selectively operable means (not shown). The chain is moved so that the rollers in the upper run rotate clockwise as seen in FIG. 1 so that a tortilla introduced into the enclosure is carried away from the tortilla feeding mechanism 24 by the upper run of rollers to the enclosure outlet via the third and second roller runs.

Means are provided between the first and third runs of rollers, and between the third and second runs of rollers, for turning a tortilla as it is passed from the first to the third run and from the third to the second run, respectively. As illustrated in FIG. 1, the tortilla turning apparatus includes a roller 48 disposed adjacent the terminal end of the first run of rollers. Roller 48 rotates in a counterclockwise direction so that a tortilla which engages this roller is passed downwardly between it and the adjacent roller of the first roller run to the beginning end of the third run of rollers. Similarly, a roller 49 is disposed adjacent the terminal end of the third run of rollers and rotates in a clockwise direction so that a tortilla introduced thereto passes between it and the adjacent roller of the third roller run to be passed to the beginning end of the second run of rollers. Chain 45 is engaged with sprockets secured to rollers 48 and 49 in such a manner that rollers 48 and 49 rotate in directions opposite to the direction of rotation of the rollers in roller runs 34 and 36, respectively, as shown in FIG. 2 with respect to roller 49.

Controllable means are disposed interiorly of the enclosure at selected locations along the conveyor for heating tortillas during transport thereof through the enclosure by the conveyor. As illustrated in FIG. 1, the controllable means comprise a plurality of elongated tubular heater elements 51 disposed below the first, second and third runs of rollers preferably intermediate substantially each adjacent pair of rollers in the respective roller runs. Preferably the heater elements are disposed with their elongate etxents transverse to the path a tortilla follows through the oven. Heater elements 51 may be gas burners or electrical resistance heating elements. The heat produced by operation of elements 51 heats rollers 32. The rollers transfer the absorbed heat to the tortillas passing over the rollers. Additionally, heat is passed upwardly between the rollers from the elements for additional baking action upon the tortillas. Each heater element is connected to a suitable energy source.

FIG. 3 illustrates a second preferred embodiment of the invention wherein each heating element 55 is disposed interiorly of a conveyor roller. Preferably, elements 55 are electrical resistance heaters, although gas burners may be used if desired. In ovens where heater elements 55 are gas burners, the roller end plates are perforated so that heated air may circulate from the interior of enclosure 12 to the interior of the rollers. In the embodiment of the invention illustrated in FIG. 3, axle 41 is axially bored to allow the insertion of heater element 55 into the associated roller. The heater element thus is stationary, whereas the roller is rotatable.

The conveyor rollers may also be rotatably mounted at only one end, with the other end being open to enable insertion of a heating element for interior heating of the roller.

It will be seen by those skilled in the art that the oven of the present invention provides the features previously described. Oven 10 may have an over-all height of about 14 inches as compared to a height of about 30 inches for a belt-type oven of similar capacity. The compactness of an oven according to this invention allows the inclusion of a tortilla cooling compartment in the same housing with the oven.

While the invention has been described above in conjunction with specific apparatus, this has been by way of example only and is not to be considered as limiting the scope of the invention.

What is claimed is:
1. An oven for baking tortillas comprising
(a) an insulated enclosure,
(b) a triple-pass tortilla conveyor in the enclosure comprised of a plurality of cylindrical rollers mounted in the enclosure for rotation about fixed parallelly aligned axes, the rollers being arranged to define
   (i) a first run of rollers disposed substantially horizontally in the enclosure and having a terminal end,
   (ii) a second run of rollers disposed substantially horizontally in the enclosure in vertically spaced apart relation to the first run and having a beginning end, and
   (iii) a third run of rollers extending from the terminal end of the first run to the beginning end of the second run,
(c) means for rotating the rollers so that the first and second runs of rollers rotate in one direction, and so that the third run of rollers rotates in the opposite direction so that a tortilla is transported from the first to the second runs of rollers,
(d) controllable means interiorly of the enclosure at selected locations along the conveyor for heating a tortilla during transport thereof by the conveyor through the enclosure, and
(e) means in the enclosure disposed in cooperation with the terminal end of the first run of rollers and with the beginning end of the second run of rollers for turning a tortilla twice during passage thereof along the conveyor and including at least one roller disposed adjacent the terminal end of the first run and the beginning end of the second run, respectively.

2. An oven according to claim 1 wherein the controllable means comprises a plurality of gas burners.

3. An oven according to claim 1 wherein the controllable means comprises an electrical resistance heating element disposed internally of selected rollers of the first, second, and third runs of rollers.

4. An oven for baking tortillas comprising
(a) an insulated enclosure having an inlet opening and an outlet opening,
(b) a triple-pass tortilla conveyor in the oven for transporting tortillas introduced into the enclosure through the inlet opening thereof away from the inlet opening to the outlet opening for discharge of the tortillas from the enclosure, the conveyor being comprised of a plurality of cylindrical rollers mounted in the enclosure for rotation about fixed parallelly aligned axes, the rollers being arranged to define
   (i) a first run of rollers disposed substantially horizontally in the enclosure and extending from the inlet opening to a terminal end of the run,
   (ii) a second run of rollers disposed below the first run in the enclosure and extending from a beginning end to the outlet opening, and
   (iii) a third run of rollers in the enclosure extending in a substantially common plane downwardly from the terminal end of the first run to the beginning end of the second run,
(c) chain drive means interconnecting the rollers for rotating the rollers so that the rollers of the first and second runs of rollers rotate in one direction, and so that the rollers of the third run of rollers rotate in the opposite direction,
(d) electrical resistance heating elements interiorly of at least some of the rollers of the first, second, and third runs of rollers for heating a tortilla during transport thereof by the conveyor through the enclosure, and
(e) in the enclosure, at least one roller disposed in cooperation with the terminal end of the first run of rollers and at least one roller disposed in cooperation with the beginning end of the second run of rollers for turning a tortilla during passage thereof from the first to the third run of rollers and from the third to the second run of rollers, respectively.

References Cited by the Examiner
UNITED STATES PATENTS

| | | | |
|---|---|---|---|
| 829,141 | 8/1906 | Cohnen | 34—203 |
| 1,263,939 | 4/1918 | Rios | 107—57 X |
| 2,765,065 | 10/1956 | Liebelt | 198—34 |

IRVING BUNEVICH, *Primary Examiner.*

WALTER A. SHEEL, *Examiner.*

J. S. SHEA, *Assistant Examiner.*